Patented Dec. 20, 1938

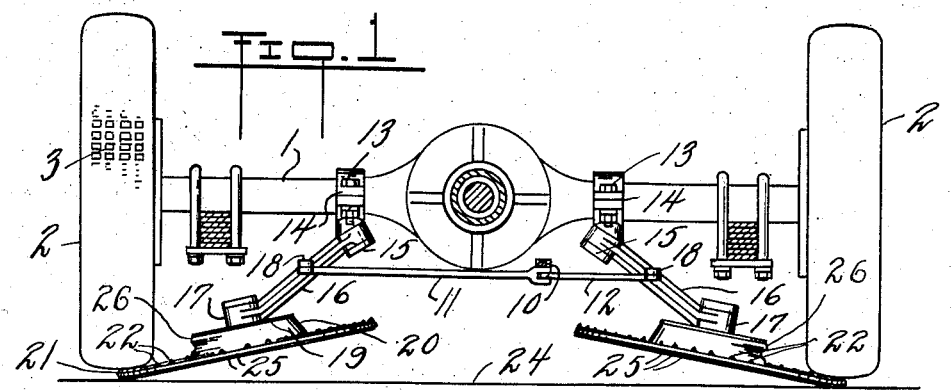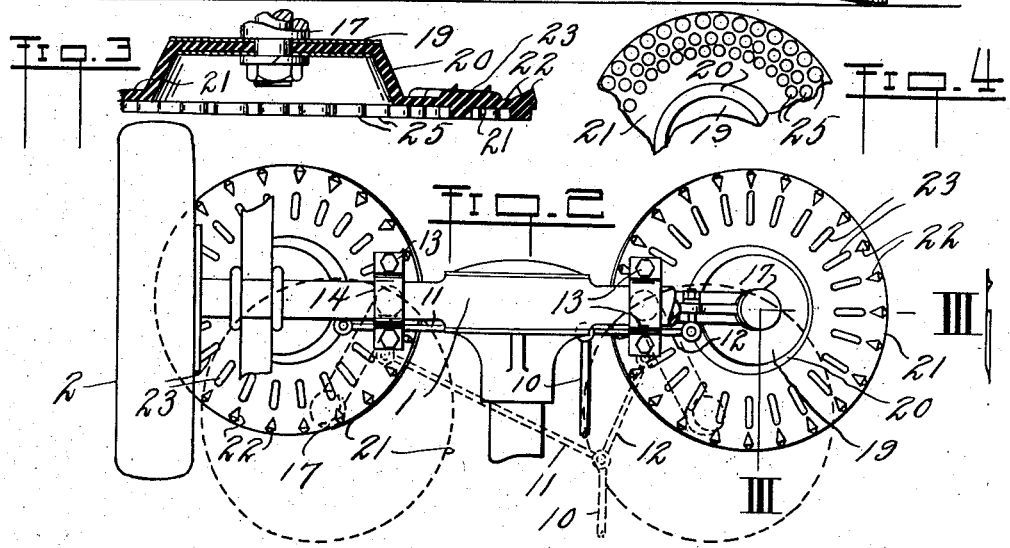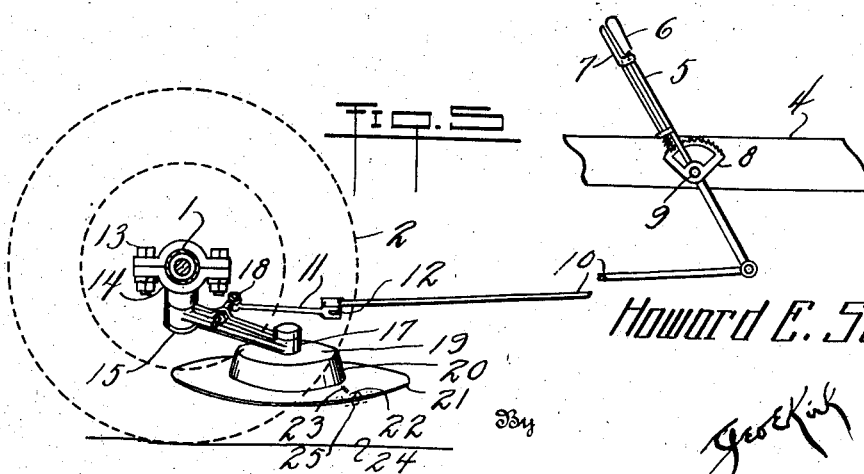

2,140,606

UNITED STATES PATENT OFFICE 2,140,606

TRACTION CONTROL

Howard E. Stickles, Toledo, Ohio

Application February 2, 1938, Serial No. 188,227

3 Claims. (Cl. 188—4)

This invention relates to tractive adherence control as between vehicle tires and the roadway therefor.

This invention has utility as a non-skid device adapted to be controllably inserted and withdrawn between the tread of a wheel and its roadway.

Referring to the drawing:

Fig. 1 is a fragmentary view toward the rear axle of a motor vehicle having an embodiment of the invention therewith and in operative position;

Fig. 2 is a plan view of the non-skid device of Fig. 1, with parts broken away, and showing in dotted lines the shift to out of use position;

Fig. 3 is a view on the line III—III, Fig. 2;

Fig. 4 is a fragmentary view of details of the bottom disk; and

Fig. 5 is a view, with parts broken away, of the control connection as from the operator's seat of the vehicle.

Motor vehicle is shown provided with rear axle 1. Traction wheels 2 provided with treads 3 are carried by the axles of the vehicle with chassis 4. Adjacent the driver's seat, there is control lever 5 having grip portion 6 operable from grip 7 as to quadrant 8 for holding this lever in various thrown positions. From this lever 5 having fixed fulcrum 9 extends rod 10 to links 11, 12. Bolts 13 clamp collar 14 on the axle 1 and locate hinge pin 15, from which extends arm 16 to hub 17.

This arm 16, intermediate the hinge pin 15 and the hub 17, has offset 18 by which link 11 is connected to one of the arms and link 12 connected to the other. This hub 17 mounts therewith relatively rotatable disk having central portion 19. This portion 19 has flexible offset 20 therefrom to major disk or rim portion 21. The portion 21 has on its upper side inwardly tapering lugs 22 to inwardly extending ribs 23. These ribs 23 form the traction promoting portion to be contacted by the tread 3 of the vehicle in thrusting such rim of the non-skid disk against roadway 24. This causes adherent portion or knobs 25 on the opposite side of this disk rim to engage such roadway against slipping.

In practice, the disks are normally clear of the roadway as pulled up under the chassis of the vehicle. As these traction or propelling wheels have effective road adherence, whether from slipping or burying, the operator may swing these disks from the idle intermediate position under the vehicle toward the treads. This may occur when the wheels are spinning to work the disks into operative position in spacing or partly spacing the treads from the roadway or supporting region therefor. At such rear swung position the links are toggle-locked against shifting of the hub 17. The disks are in position for freely spinning as the treads 3 operate thereover. These treads may squeeze the knobs 25 into traction-effecting position into the supporting roadway. This operation may occur whether the way be paved or unpaved or wherever the vehicle may be, for effective holding and gripping action. The disk is free to turn in its transit with the vehicle while holding or providing a traveling roadway for the tread 3.

The offset 20 of the disk is a yieldable portion which allows the active rim portion proper of the disk to conform to the tire and road irregularities not only as out of the plane of the disk but has a radial give at 26 sufficient to avoid distortion of the tread as to the wheel. In this operation, the initial contacting of the disk by the tire is on the higher portions 22 and the tread 3 readily moves therefrom to the rib portions 23, and such as radially extending minimize the radial creep-in accommodating the disk to this traction action. As the emergency has passed the operator of the vehicle may effect reverse shifting of the lever 5 promoting such release by reversing the gear on the vehicle so that the tendency for return shifting is promoted by the action of the tread on the disks, and there is promoted a course for working out from under the wheels without necessity for jacking up and locating as may be the occasion for mounting the disks in working position if independently of this manual control lever 5.

What is claimed and it is desired to secure by Letters Patent is:

1. A vehicle, an axle therefor, a wheel at the axle, there being a tread for the wheel, a bracket fixed with the axle, an arm swingable from the bracket having a fulcrum inclined toward the wheel, a disk rotatable on the free end of said arm, and control means for shifting the disk as to said fulcrum as an axis into cooperating position with said tread between the tread and highway.

2. A non-skid traction disk having a tread-contacting rim on one side, a roadway-contacting rim on the other side, and a hub offset from the rim for radial distortion between the hub and rim.

3. A non-skid disk with radially extending lateral traction face inwardly from the periphery providing a radially laterally flexible distortible region.

HOWARD E. STICKLES.